March 14, 1961 F. W. DOERING ET AL 2,974,367
APPARATUS FOR MAKING SPLICING-SLEEVE ASSEMBLIES
Original Filed Sept. 29, 1954 2 Sheets-Sheet 1
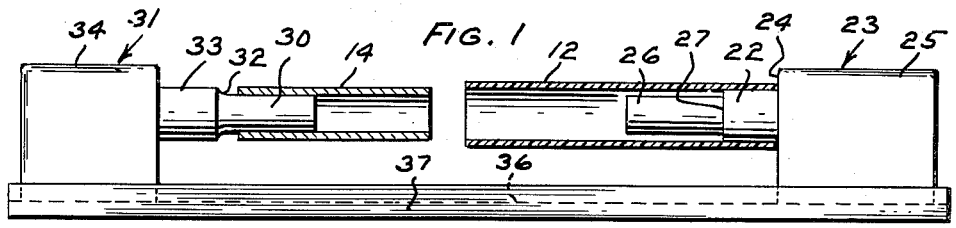
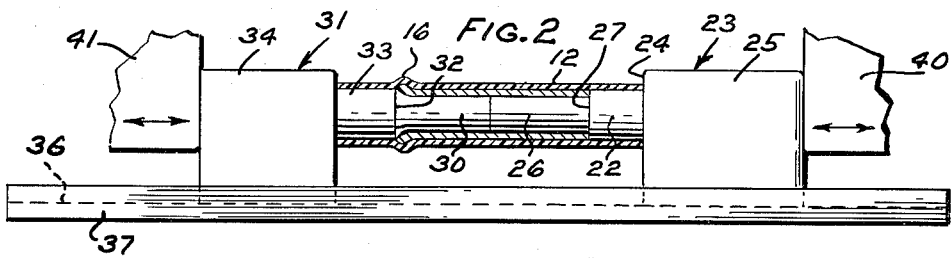
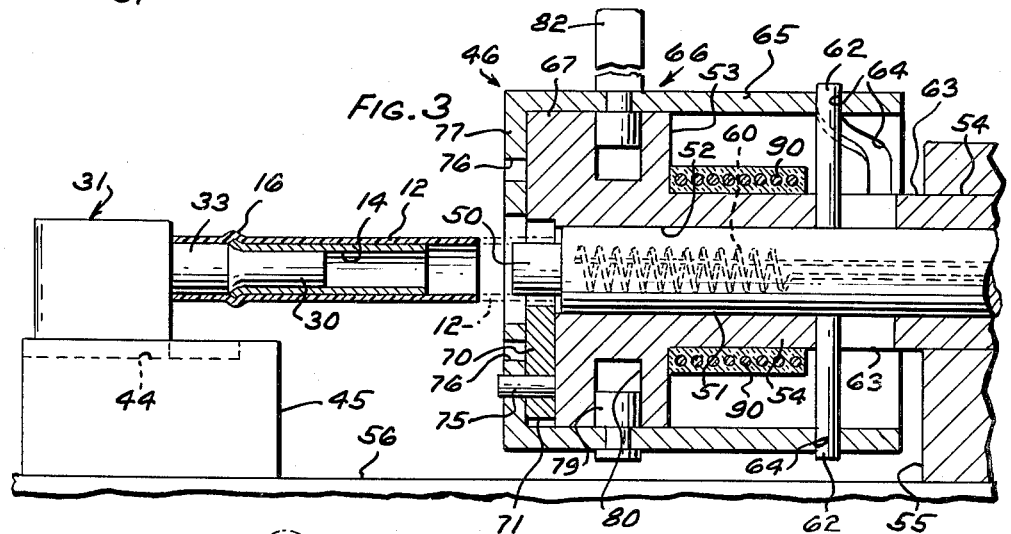
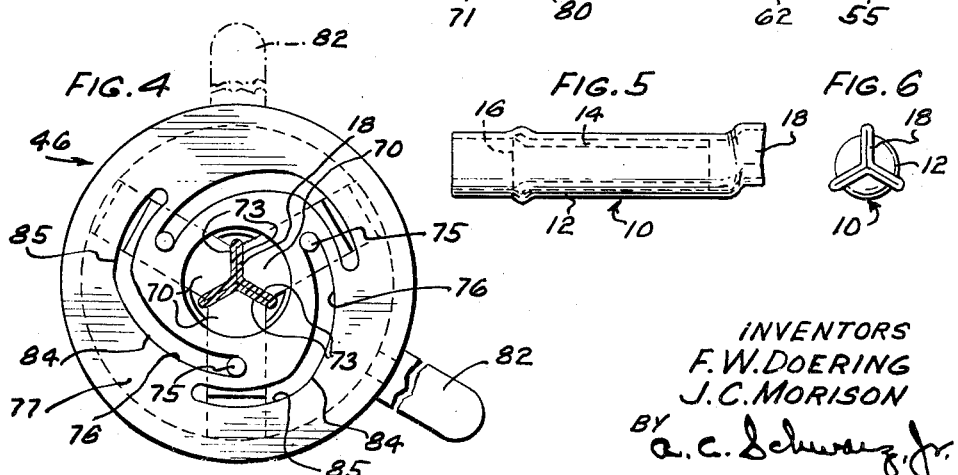
INVENTORS
F. W. DOERING
J. C. MORISON
BY
A. C. Schwarz, Jr.
ATTORNEY March 14, 1961 F. W. DOERING ET AL 2,974,367
APPARATUS FOR MAKING SPLICING-SLEEVE ASSEMBLIES
Original Filed Sept. 29, 1954 2 Sheets-Sheet 2
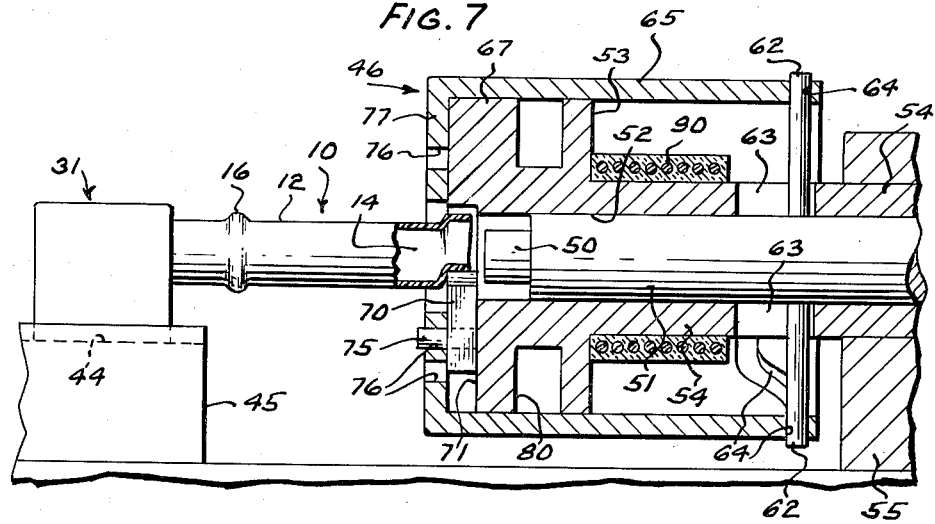
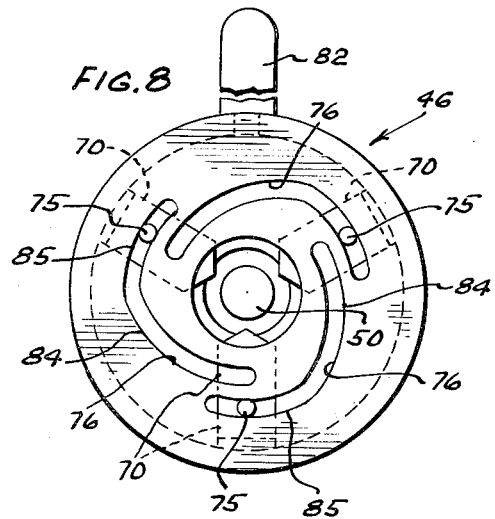
INVENTORS
F. W. DOERING
J. C. MORISON
BY A. C. Schwarz, Jr.
ATTORNEY United States Patent Office 2,974,367
Patented Mar. 14, 1961

2,974,367

APPARATUS FOR MAKING SPLICING-SLEEVE ASSEMBLIES

Fred W. Doering, Cicero, and James C. Morison, La Grange, Ill., assignors to Western Electric Company, Incorporated, New York, N.Y., a corporation of New York Original application Sept. 29, 1954, Ser. No. 459,029, now Patent No. 2,864,159, dated Dec. 16, 1958. Divided and this application Apr. 23, 1958, Ser. No. 736,944

2 Claims. (Cl. 18—19)

This invention relates to apparatus for making sleeve assemblies for splicing electrical conductors and more particularly to apparatus for flaring one end of a metal sleeve telescoped within a plastic sleeve and for sealing one of the projecting ends of the plastic sleeve. This application is a division of copending application Serial No. 459,029, filed September 29, 1954, now Patent No. 2,864,159.

An object of the invention is to provide an improved apparatus for making sleeve assemblies for splicing electrical conductors.

Another object of the invention is to provide an improved apparatus for assembling a metal sleeve within a thermoplastic sleeve to form a splicing sleeve assembly and for flaring the end of the metal sleeve to interconnect the sleeves and to guide members thereinto.

A further object of the invention is to provide an improved apparatus for assembling a thermoplastic sleeve over a metal sleeve and to seal one end of the thermoplastic sleeve to form a splicing sleeve assembly.

An apparatus illustrating certain features of the invention may include a pair of cooperating flaring tools on the shank of one of which is mounted a thermoplastic sleeve and on the shank of the other of which is mounted a metal sleeve. The sleeves and tools are aligned with each other and the tools are moved toward each other to slide the metal sleeve within the thermoplastic sleeve and to position the ends of the inner metal sleeve in a predetermined spaced relation to the ends of the thremoplastic sleeve, after which the tools with the telescoped sleeves thereon are placed between a pair of relatively movable pressure applying jaws which are actuated to move the tools together to flare one end of the inner metal tube into interlocking engagement with the other tube. One of the tools with the interlocked sleeves thereon is positioned in alignment with a sealing device and moved to telescope one end of the plastic tube over a retractible heating element of the sealing device to be internally heated thereby and a plurality of radially movable heated forming jaws are actuated in timed relation to the retraction of the heating element to press the walls of the end portion of the tube laterally against each other to seal said end of the tube.

Other objects and advantages of the invention will become apparent by reference to the following detailed description and the accompanying drawings illustrating a preferred embodiment thereof, in which Fig. 1 is an elevational sectional view of the metal and thermoplastic sleeves to be assembled mounted on a pair of cooperative flaring tools in spaced relation to each other;

Fig. 2 is a view of the metal and thermoplastic sleeves mounted on the flaring tools and in assembled relation;

Fig. 3 is a vertical sectional view of a sealing device and the assembled sleeves supported on one of the flaring tools in position to be moved into engagement therewith;

Fig. 4 is an end view of the sleeve sealing device;

Figs. 5 and 6 are side and end views, respectively, of the sleeve assemblies,

Fig. 7 is a vertical view, partly in section, of the sealing device shown in Fig. 3 with parts of the apparatus in changed position; and Fig. 8 is an end view of the sleeve sealing device with the jaws thereof in open position.

Referring to the drawings, Figs. 5 and 6 show a splicing sleeve assembly 10 for splicing the ends of electrical conductors. The sleeve assembly 10 comprises an outer sleeve 12 of thermoplastic material and an inner sleeve 14 of metal such as aluminum or brass which is slidable within the outer sleeve and positioned therein with the ends in spaced relation to the ends of the outer sleeve, and one end of the inner sleeve 14 is flared as at 16 to deform the outer sleeve 12 and interconnect the two sleeves against relative displacement and to guide into the metal sleeve the conductors which are to be spliced. The end portion 18 of the outer thermoplastic sleeve 12 is collapsed and the wall portions thereof are pressed into engagement with each other and heated to seal said end of the tube.

In making the sleeve assembly 10 one end of a cylindrical thermoplastic sleeve 12 is slid over the shank portion 22 of a flaring tool 23 and is supported thereby with the end of the tube engageable with a shoulder 24 formed on the head 25 of the tool. The shank has a reduced portion 26 for telescopingly receiving one end of the metal tube 14, one end of which is engageable with a shoulder 27 formed on the shank 22. One end of the cylindrical metal sleeve 14 is adapted to be telescoped over a shank 30 of a cooperating flaring tool 31. The shank 30 has an outwardly curved portion 32 forming an annular forming surface for flaring one end of the metal tube 14 and an enlarged portion 33 of the shank is adapted to receive one end of the plastic tube 12. The tool 31 has a rectangular head 34 which fits into a guideway 36 of a guide member 37 along with the head 25 of the tool 23 for positioning the shanks of the tools and the sleeves 12 and 14 in coaxial alignment with each other, whereby the tools may be moved towards each other to slide the metal sleeve 14 within the plastic sleeve 12 and to position them with the end of the sleeve 14 abutting the shoulder 27 of the tool 23. The tools 23 and 31 with the sleeves 12 and 14 supported thereon in telescoping relation are then moved between a pair of relatively movable pressure transmitting heads 40 and 41 of a press or other device which is actuated to move the flaring tools 31 and 23 towards each other to a predetermined position with the ends of the shanks 26 and 30 of the tools in abutting engagement with each other to cause the flaring surface 32 to flare the end 16 of the tube 14 outwardly into engagement with the plastic sleeve 12 to form an interlocking connection therewith. The tools 23 and 31 with the interlocked sleeves 12 and 14 thereon are withdrawn from the heads 40 and 41 and the tool 31 with the assembly of sleeves 12 and 14 thereon is removed from the tool 23 and placed in a slideway 44 of a guide 45 with the sleeves 12 and 14 in coaxial alignment with the axis of a sealing device 46.

In response to the movement of the tool 31 to a predetermined position against a stop on the guide 45 the forward end of the plastic tube 12 is moved into an aperture in the sealing device 46 and is telescopingly positioned about the end of a cylindrical heater member 50 as indicated in dotted lines in Fig. 3 for internally heating the end portion of the plastic tube 12 prior to the walls thereof being collapsed and pressed into sealing engagement with each other. The cylindrical heating member 50 has an enlarged body portion 51 and is mounted for axial reciprocation in a bore 52 of a supporting member 53. The member 53 has a cylindrical shank 54 which is stationarily supported by a bracket 55 mounted on a base plate 56 on which the guide 45 is also mounted. An electrical heating element 60 mounted in a bore in the heating member 50 is connected to a source of electrical power for heating the member 50.

The heating member 50 is withdrawn from the end of the tube 12 prior to the sealing of the tube and for this purpose the heating member 50 is provided with a pair of radially directed pins 62 extending through axial slots 63 in the shank of the body member 53 and with the ends thereof disposed in cam slots 64 of a cylindrical skirt 65 of an actuating member 66 oscillatably supported on the head 67 of the supporting member 53. The cam slots 64 are so designed that in response to a predetermined oscillating movement of the actuating member 66 the heating member 50 will be reciprocated to and from its normal position shown in Fig. 3 and a retracted position in spaced relation to the end of the tube 12 positioned within the sealing device 46.

Three sealing jaws 70 are mounted for radial movement toward and away from each other in radially disposed guideways 71 formed in the head 67. The sealing jaws 70 each have a pair of diverging forming surfaces 73 which are adapted to engage the outer surfaces of portions of the end of the sleeve and collapse the walls of the sleeve inwardly and press them together against each other into a Y shape in response to movement of the sealing jaws radially from a normal outer position shown in Fig. 3 to an operative position indicated in Fig. 4. The sealing jaws 70 have pins 75 which project into cam slots 76 formed in a transversely disposed centrally apertured end wall 77 of the actuating member 66. The actuating member 66 is held against axial displacement by a plurality of pins 79 riding in an annular groove 80 in the head 67 and the actuating member 66 has a handle member 82 of heat insulating material secured thereto by means of which it may be oscillated. The cam slots 76 and the actuating member 66 have spiral portions 84 for moving the sealing jaws to and from their operative positions and have dwell portions 85 concentric with the axis of the head for maintaining the sealing jaws in inoperative position during the actuation of the heating member 50 to and from its normal and retracted positions.

An annular electrical heating element 90 is mounted on the shank 54 of the supporting member 53 in engagement with the head 67 to heat the head and the sealing jaws 70 to a predetermined temperature. Thus, when the jaws are moved inwardly to compress the walls of the plastic sleeve 12 into engagement with each other the heated jaws serve to aid in heating the end portion of the sleeve to a state of plasticity necessary to achieve a good seal between the wall portions of the tube. The heating elements 60 and 90, if desired, may be sufficiently large so that either one may heat the end of the thermoplastic sleeve to the required temperature.

In order to seal the end of the thermoplastic sleeve 12, the tool 31 is moved forward in the guideway 44 to its forward position to dispose the end portion of the plastic tube 12 over the heating member 50 and be internally heated thereby, and after a predetermined period of time sufficient to heat the sleeve to a predetermined temperature, the handle 82 may be oscillated to rotate the actuating member 66, during the first portion of which the heating member 50 is retracted from its operative position within the end of the sleeve, after which the heated sealing jaws are moved from their outer position inwardly to collapse the walls of the end portion of the sleeve 12 and press them into engagement with each other while applying heat thereto to seal the end of the tube.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for sealing the end of a thermoplastic tubular member of a composite article, a base, means on said base for supporting the article for movement along a horizontal axis and for stopping it in a predetermined position to locate the end of the tubular member in a closing station, a rod telescopingly engageable with one end of the tubular member, a plurality of closing jaws, a support on said base having a longiudinally disposed bore for supporting said rod for movement along said axis and having radially disposed guideways for supporting said jaws for movement toward and away from said axis at said closing station, an actuating member having a hollow cylindrical portion provided with a first cam for imparting longitudinal movement to said rod along said axis and having an end wall provided with second cams for actuating said jaws, means for mounting said actuating member on said support for oscillatory movement about said axis and against movement in an axial direction, means for oscillating said actuating member, and means for heating said closing jaws and said rod, said actuating member being movable in one direction to effect the movement of the rod to said closing station into telescoping engagement with said end of the tubular member to heat it and to effect the movement of the forming jaws from the axis and being movable in the other direction to effect the movement of the rod from said end of the tubular member and the movement of the forming jaws into engagement with said end to press together and seal the end portion of said tubular member.

2. In an apparatus for sealing the end of a thermoplastic sleeve of a composite article, a base, means on said base for supporting the article for movement along a substantially horizontal axis and for stopping it in a predetermined position to locate the end of the sleeve in a closing station, a rod having an end portion telescopingly engageable with one end of the sleeve and having a cam follower, a plurality of jaws for closing the end of the sleeve, a supporting member having a reduced shank and an enlarged cylindrical portion with a flat end, said supporting member having a longitudinally disposed concentric bore for slidably supporting said rod and having a slot in said shank for receiving the cam follower of said rod and cooperating therewith to hold said rod against rotation, means engageable with said shank for securing the supporting member on said base with the bore in coaxial alignment with said axis, said supporting member having radially disposed guideways formed in said end thereof for supporting said jaws for movement toward and away from said axis at said closing station, an actuating member having a cylindrical wall provided with cam slots engageable with the cam follower on said rod for imparting longitudinal movement thereto and having an end wall provided with a central aperture and a plurality of cam slots cooperable with said jaws for imparting radial movement thereto in response to oscillatory movement of said actuating member, means for mounting said actuating member on said supporting member for oscillatory movement about said axis and against movement in an axial direction, means for oscillating said actuating member, means including an electrical coil mounted within said rod for heating said end portion thereof, and means including an electrical coil mounted on the shank of said supporting member for heating said supporting member and said closing jaws slidable thereon, said actuating member being rotatable in one direction to effect the movement of the rod in said closing station into telescoping engagement with said end of the thermo-plastic sleeve to heat said end and to effect the movement of the forming jaws from the axis, said actuating member being rotatable in the opposite direction to effect the movement of the rod from said end of the thermo-plastic sleeve and the movement of the forming jaws toward said axis into engagement with said end portion of said sleeve to press together and seal said end portion.

References Cited in the file of this patent

UNITED STATES PATENTS

| | | |
|---|---|---|
| 1,493,515 | Berthold | May 13, 1924 |
| 2,391,077 | Sticht | Dec. 18, 1945 |
| 2,715,087 | Barradas | Aug. 9, 1955 |
| 2,803,695 | Woolley | Aug. 20, 1957 |